United States Patent [19]

Ballentine et al.

[11] Patent Number: 4,695,428

[45] Date of Patent: Sep. 22, 1987

[54] SOLDER COMPOSITION

[75] Inventors: Richard E. Ballentine, Montevallo, Ala.; Robert M. Henson, Cincinnati, Ohio

[73] Assignee: J. W. Harris Company, Cincinnati, Ohio

[21] Appl. No.: 898,498

[22] Filed: Aug. 21, 1986

[51] Int. Cl.⁴ .................. C22C 19/00; C22C 18/02
[52] U.S. Cl. ................................ 420/561; 420/560
[58] Field of Search ............................. 420/560, 561

[56] References Cited

U.S. PATENT DOCUMENTS 1,437,641 12/1922 Ferriere et al. ............... 420/560
1,869,378 8/1932 Konigsberg ................... 420/561

FOREIGN PATENT DOCUMENTS 2449133 10/1980 France ........................ 420/561
183037 6/1966 U.S.S.R. ...................... 420/561

Primary Examiner—L. Dewayne Rutledge
Assistant Examiner—Robert L. McDowell
Attorney, Agent, or Firm—Roesch, Lynda E.

[57] ABSTRACT

A low temperature, lead-free, cadmium-free solder for joining metals, primarily copper tube or brass pipe and fittings. The solder composition, being free of lead and other known toxic metals, has a composition range of 0.5–4.0% antimony, 0.5–4.0% zinc, 0.1–3.0% silver, 0.1–2.0% copper and 86.8–98.8% tin, is especially adaptable for plumbing applications where solder joints are exposed to potable water.

6 Claims, No Drawings

SOLDER COMPOSITION

CROSS REFERENCE TO RELATED APPLICATIONS

Reference should be had to "Solder Composition" By Robert M. Henson and Kent H. Cartheuser, Ser. No. 759,596, filed July 26, 1985.

BACKGROUND

This invention relates to a novel non-toxic solder composition with the unique ability to flow into tightly fitted joints and also bridge the frequent gaps commonly found in larger size copper or brass pipe and tubing. The present invention is particularly concerned with the provision of a solder composition especially adapted for joining copper tubing, brass pipe and fittings to be used in plumbing.

There is ample evidence lead is significantly toxic, and it has long been known that lead in drinking water can contribute to high blood levels of lead. Historically, lead contamination of drinking water has originated from lead service pipe which leached lead into water. Lead pipes were common one hundred years ago, but they have been replaced by copper or plastic pipe.

Soldering is a well known and well accepted means for securing in a permanent fashion metal parts. Solder material must have the capacity to form metallurgical bonds with the two base metals that are to be joined. The bonding process results in the formation of an alloy in the surface of the base metal characterized by atoms of the soldering composition interspersed between atoms of the base metal.

The soldering material must be free flowing to fill the capillary and yet have ability to bridge gaps or form small fillets. The solder metal fills the joint by capillary attraction. When the solder is heated to a molten state, it exists as a round droplet as a result of the attraction of the molecules within the alloy for each other. This attraction is commonly referred to as surface tension. As the solder or filler metal enters the joint area, the molecules are attracted to the base metal. This causes a disruption in the natural rounded droplet state and results in wetting the walls of the base and filling the capillary. The metal returns to a curved state and repeats the wetting process until the length of the joint is filled.

The bond strength is dependent on the nature of the base metals, the nature of solder metal, the thickness of the capillary, the compatibility of the base metal and the solder metal, and the solder temperature. Joining of copper tube and pipe can be achieved by brazing or low temperature soldering. Brazing, however, anneals the tubing, thereby softening the metal. Brazing requires high temperatures, longer heating times and poses potential fire hazards when joining water tube with an open flame.

Copper tube and pipe are used extensively in residential and commercial drinking water systems. However, copper tubing and pipe have in the past been universally joined with lead-bearing solders. There is a mounting evidence these solders may affect drinking water quality. Most importantly, since lead accumulates in the body, lead leaching is a serious health threat, especially to fetuses and children. The medical literature fully documents the health hazards high levels of lead pose.

While lead will corrode in potable water, certain factors influence corrosion rates. Water-induced corrosion in Plumbing is electrochemical in nature. Soft, low pH level, acidic water is more aggressive and results in greater galvanic lead corrosion. Much of the untreated public water supply in the eastern, southeastern and northwest portions of the United States is typified by these characteristics. This phenomenon, then, affects a large percentage of the population and merits serious attention.

Although the lead-tin solders have been used to join copper and brass for years, their use in drinking water systems is highly questionable. Because of the lead content, this family of solders has proven significantly toxic in drinking water applications. With the passage by Congress of public law 99-339 effective June 19, 1986, the states have been given 24 months to substantially eliminate lead in solders used to join copper and brass tubing or pipe in potable water systems. The use of lead bearing solders has already been banned in at least five states and a number of foreign countries.

State and federal agencies are taking steps to reduce potential contamination of the potable water supply by restricting use of lead-bearing solders utilized in copper tubing and pipe adapted for drinking water systems. Delaware, Mass., Minn., Oreg. and Wis. have enacted legislation banning lead solder in plumbing that provides piped water for human consumption. Seattle and selected cities on Long Island have done the same. Recently, the Lead Free Drinking Water Act was introduced and passed in Congress prohibiting the use of lead solders in any distribution system of drinking water intended for human consumption.

The most popular solder currently used in plumbing contains up to 50% lead. Popularly known as 50/50, it is composed of 50% tin and 50% lead. Plumbers have used this solder in drinking water systems for many years and have become accustomed to its wetting and flow properties. It has a melting range of 360° F. to 420° F. This is a comparatively low plastic range and is most suitable for soldering copper joints. The tin/lead solders are the most widely used solders for joining metals and are also used in the electronics industry and automobile industry, although they are not particularly suited to applications involving high stress and vibration. Alternative lead-free solders are available, but none exhibit the desirable characteristics of the lead solders, such as flow properties, wetting properties and melting range.

A solder containing 95% tin, 5% antimony is sometimes used as a replacement for 50/50 solder. Tin/antimony solders have suitable soldering and strength properties. They possess higher strength and elongation properties although such solders are also unsuitable for applications subjected to high stress and vibration as for example, in the cooling industry. While such a composition avoids lead contamination, the 95/5 does not wet base metals as well. However, it melts at a higher temperature, 454° F., and thus is less desirable. In addition, the melting range is fairly limited. Tin-antimony solders are not usually recommended in brass applications.

Solders comprised of tin and silver are available, but these compositions either are too fluid when molten or have higher melting temperatures. They have a liquidus temperature ranging from 430° F. to 535° F. Although tin-silver solders also avoid the problem of lead contamination, the cost, due to silver content, is somewhat prohibitive. Therefore, a non-toxic solder having properties similar to the 50/50 tin-lead and less expensive than tin-silver alloys would be useful and particularly suited to plumbing.

The available lead free solders, (tin-antimony) and (tin-silver) have found only limited acceptance in the field. Both are quite fluid and require skilled operators to fill the wide gaps often encountered between faying parts of larger pipe or tube joints.

Operators accustomed to using the tin-lead solders will find it difficult to adjust to these presently available substitutes, especially where poor fit ups are encountered.

This invention offers an alternative solder, more closely approximating the performance of tin-lead and in fact exhibits advantage in bridging gaps in poorly fitted joints.

The invention uses additions of zinc, antimony, silver and/or copper to tin to create a solder capable of filling tight cavities as well as the wide gaps. We have found that the addition of a small amount of copper does not impair the flow and wetting properties, but does add extra body so that poor fits, i.e. gaps, can be handled with ease.

The prior art has not provided a solder composition exhibiting optimum wetting and flow properties without toxicity. Current federal, military and commercial solder specifications lack a suitable non-toxic composition. The composition of the present invention is not disclosed or suggested by current patents.

U.S. Pat. No. 1,947,938, issued to E. Hey discloses a process for manufacturing solder alloys. It teaches the use of tin and zinc in solder combination, but also aluminum and lead may be substituted. Tin zinc solders are particularly suited for use in soldering aluminum. However, solder compositions having a high zinc content raise the liquidus temperature, thereby making application of the solder difficult. Solders having high melting temperatures are unsatisfactory for copper soldering.

U.S. Pat. No. 2,480,723, discloses a flux/solder powder in suspension, primarily used for soldering cans. Evans, et al., addresses the problem of maintaining solder particles suspended in a fluxing composition. All solder compositions suggested for use in connection with the Evans invention contain lead. For example, at line 44 et seq., column 3, the patentee suggests solder compositions of "silver and lead; tin, lead and antimony; tin, lead and silver; cadmium and lead and similar combinations in varying ratios."

U.S. Pat. No. 2,713,315, issued to McBride, covers a cored solder wire for automatically soldering the aluminum base on electrical lamp bulbs. Solder compositions are tin-lead-cadmium, or tin-cadmium. Such solder compositions are not without toxicity. Cadmium poisoning from fumes can result in serious illness to the operator.

U.S. Pat. No. 3,471,310, issued to Joseph, et al., outlines a flame spray material and flux utilizing a resin coating to reduce oxidation. Joseph, et al., at line 70 et. seq., column 6, teaches the use of zinc, cadmium, lead and tin. There is no recognition in this patent of the toxic disadvantages associated with the use of lead or cadmium in solder compositions destined for use in drinking water systems.

U.S. Pat. No. 4,373,974, discloses a solder cream for electronic circuitry. The primary attribute is the elimination of solder "balls" formed during soldering. In column 5, lines 62 through column 6, line 9, solder composition are "conventional single or multiphasic metal normally used for soldering." The preferred embodiment is lead, tin and silver.

Accordingly, an object of the present invention is to provide a non-toxic solder composition, having desirable flow and wetting properties. Another object of the invention is to provide a lead-free, cadmium-free solder composition with a suitable melting range and exhibiting the appropriate wetting and flow characteristics. A further object of the present invention is to provide a lead-free solder composition with the appropriate strength for use in plumbing systems that carry human drinking water. Still another object of the invention is to provide a low cost, non-toxic solder composition for applications in joining brass or copper tubing and pipe. A further object of the present invention is to provide a non-toxic solder which effectively bridges poorly fitting joints.

SUMMARY OF THE INVENTION

The above objects and advantages are achieved according to the invention by providing a solder composition free of lead and adding various small amounts of antimony, zinc, silver and copper either in combination or singly. Satisfactory results have been achieved with compositions comprising by weight, 0.5%–4.0% antimony, 0.5%–4.0% zinc, 0.1%–3.0% silver, 0.1%–2.0% copper and 88.0%–98.8% tin. The unique addition of approximately 0.1–3% silver has the advantage of lowering the liquidus of a tin-antimony composition. However, the addition of a small amount of zinc results in a melting range of 60° F. The addition of copper suprisingly adds extra body to the composition so that poorly fitting joints can be effectively bridged. Accordingly, this composition has a melting range comparable to a 50% lead/50% tin solder composition and is thus suitable for soldering copper joints.

An optimum composition by weight comprises 3.0% antimony, 1.5% zinc, 0.5% silver, 0.5% copper and 94.5% tin. This solder composition has a melting range of 420° F. to 443° F. It exhibits desirable flow characteristics and produces a good deposit appearance.

DETAILED DESCRIPTION OF THE INVENTION

The present invention comprises lead-free solder formulations with melting and flow characteristics similar to the 50/50 tin-lead solders but without the toxic element, lead. The composition is not listed in current federal, military or commercial solder specifications.

There are no phase diagrams readily available from which to determine new alloy compositions. This problem was compounded by the vast number of mathematical combinations involving various elements and percentages. Tin-antimony solder compositions have relatively high liquidus temperatures. The addition of 0.1–3% silver to tin/antimony does lower the liquidus temperature below that of the tin/antimony solder. In order to approach the performance of the 50/50 solder, however, it would be desirable to provide an even lower and wider melting range. We have found that the addition of a small amount of zinc to this blend accomplishes this purpose.

Zinc is not generally present in solders with the exception of a zinc-aluminum alloy which melts at 720° F. which is unsuitable for low temperature copper soldering and a tin-zinc alloy which melts at 390° F. and is difficult to apply. Because of their unmanageable characteristics, zinc-aluminum and tin-zinc alloys have been used almost exclusively on aluminum joints. Replacing lead with selected amounts of zinc, silver and antimony in a tin base is a new approach.

The addition of copper to this composition results in bridging characteristics which approximate those of 50/50 tin-lead solders.

The solder composition found to exhibit the desired melting range and wetting and flow properties is comprised by weight as follows:

| Antimony (Sb) | 0.5%–4.0% |
| Zinc (Zn) | 0.5%–4.0% |
| Silver (Ag) | 0.1%–3.0% |
| Copper (Cu) | 0.1%–2.0% |
| Tin (Sn) | Remainder |

EXAMPLE A

Example A was prepared, by weight, as follows:

| Antimony (Sb) | 4.0% |
| Zinc (Zn) | 4.0% |
| Silver (Ag) | 1.0% |
| Copper (Cu) | 0.2% |
| Tin (Sn) | 90.8% |

This solder has a solidus of 390° F. and a liquidus of 460° F. The flow properties are adequate but the solder deposit has a grainy appearance. The alloy produces effective bridges.

EXAMPLE B

Example B was prepared, by weight, as follows:

| Antimony (Sb) | 1.0% |
| Zinc (Zn) | 0.5% |
| Silver (Ag) | 0.5% |
| Copper (Cu) | 0.8% |
| Tin (Sn) | 97.2% |

The solidus of this solder composition is 412° F., and the liquidus is 438° F. The solder exhibits adequate flow and appearance characteristics. The deposit is smooth and results in adequate bridges.

EXAMPLE C

Example C was prepared, by weight, as follows:

| Antimony (Sb) | 2.0% |
| Zinc (Zn) | 3.0% |
| Silver (Ag) | 1.5% |
| Copper (Cu) | 1.0% |
| Tin (Sn) | 92.5% |

The solidus temperature is 420° F., and the liquidus temperature is 530° F. The solder exhibits good wetting and flow characterisitics and provides an acceptable deposit appearance. Although the soldering temperature is somewhat higher for this alloy, the bridging properties are acceptable.

EXAMPLE D

Example D was prepared, by weight, as follows:

| Antimony (Sb) | 3.0% |

-continued

| Zinc (Zn) | 1.5% |
| Silver (Ag) | 0.5% |
| Copper (Cu) | 0.5% |
| Tin (Sn) | 94.5% |

This alloy has a solidus temperature of 420° F. and a liquidus temperature of 443° F. The solder provides excellent flow characteristics and bridging properties, and a smooth deposit appearance.

EXAMPLE E

| Tin (Sn) | 96.5 |
| Silver (Ag) | 3.0 |
| Copper (Cu) | 0.5 |

This alloy has a solidus temperature of 420° F. and a liquidus temperature of 444° F. The solder also provides excellent flow characteristics and bridging properties with a very smooth deposit appearance.

In order to determine the suitability of the present invention for soldering copper tube, various tests were conducted on examples A, B, C and D. The soldered joint should exhibit adequate properties, comparable to the tin/lead alloys that the new composition is designed to replace.

Flow-Copper tube sections of ½", ¾" and 1" diameter were cleaned, fluxed and inserted into standard commercial copper couplings. The joints were heated using an accepted technique with a propane torch. Solder examples A, B, C and D all penetrated the depth of the joint. Samples prepared with 50/50 tin/lead, and 95/5 tin/antimony also penetrated the depth of the joint.

The flow characteristics of this solder are closer to the 50/50 tin/lead than any of the standard replacement alloys currently available. As mentioned, the similarities in temperature and "plastic range" (the difference between the solidus and liquidus temperature) make this lead-free solder unique. Table I illustrates the similarities and the melting range of the new composition and 50/50 tin/lead solder composition.

TABLE I

| Solder | Sn | Pb | Sb | Ag | Zn | Cu | Solidus* | Liquidus* | Melting Range* |
|---|---|---|---|---|---|---|---|---|---|
| 95/5 | 95 | — | 5 | — | — | — | 452 | 464 | 12 |
|  |  |  |  |  |  |  | Solidus | Liquidus | Melting |
| 96.5 TS | 96.5 | — | — | 3.5 | — | — | 430 | 430 | 0 |
| 95 TS | 95 | — | — | 5.0 | — | — | 439 | 535 | 105 |
| 50/50 | 50 | 50 | — | — | — | — | 360 | 420 | 60 |
| A | 90.8 | — | 4.0 | 1.0 | 4.0 | 0.2 | 390 | 460 | 60 |
| B | 97.2 | — | 1.0 | 0.5 | 0.5 | 0.8 | 412 | 438 | 26 |
| C | 92.5 | — | 2.0 | 1.5 | 3.0 | 1.0 | 420 | 530 | 110 |
| D | 94.5 | — | 3.0 | 0.5 | 1.5 | 0.5 | 420 | 443 | 23 |
| E | 96.5 | — | — | 3.0 | — | 0.5 | 420 | 444 | 24 |

*In degrees Fahrenheit

Tests were also conducted on various compositions to compare burst strength. One inch diameter, type L, copper tube sections, seven inches in length were used to fabricate burst pressure specimens. A cap was soldered to one end, and a threaded adapter was soldered to the other end. The assembly was pressurized with oil until failure occurred in either the tube or the soldered joint. Assemblies were soldered with 95/5, 96.5 T.S., 50/50, example C, example D and example E. All test failures, including assemblies soldered with new compositions, were in the tube at over 4000 PSI. This indicates adequate joint strengths even with pressure exceeding normal operating limits.

Additional mechanical tests were conducted on the various compositions to compare physical properties. Copper flat strips, 0.125 inch thick, 1½ inches wide and 5 inches in length were overlapped ½ inch and soldered with 95/5, 50/50 composition C, composition D and composition E. The soldered strips were tension tested to determine the load required to fracture. This is a shear/tensile strength test conducted in accordance with the ASME Boiler and Pressure Vessel Code, Section IX, QB-463, IC. Table II reflects the load required to fracture each of the solder compositions.

TABLE II

| Solder | Load |
| --- | --- |
| 95/5 | 2,835 lbs. |
| 50/50 | 2,305 lbs. |
| Example C | 1,883 lbs. |
| Example D | 2,800 lbs. |
| Example E | 2,800 lbs. |

The tensile/shear test was conducted for comparison purposes as it is not indicative of stress to which a tube joint would be subjected. However, the results do illustrate the increased strength of composition D & E verses the 50/50. Both compare favorably with the strength of the 95/5.

This solder composition is adaptable to the following forms, sizes and weights. The composition may be manufactured as solid round wire in diameters from 0.020-0.250 inches. It is also suitable for solder wire cored with rosin, organic or inorganic fluxes in diameters of 0.020-0.250 inches.

The new solder may be preformed in sizes, shapes, and rounds to meet special requirements. The new composition is easily manufactured in pigs and cakes or ingots, rectangular or circular in shape. Bars in numerous cross sections, weights and lengths would also provide appropriate forms for the new composition.

In addition, the new solder may be manufactured in the form of powder-spherical balls in various sieve sizes from No. 30 (27.62 meshes per linear inch) to U.S. Sieve No. 325 (323.00 meshes per linear inch).

The new composition may be prepared as paste. This would entail mixing a powder form of the solder with a suitable flux to form a solder paste. The solder is also suitable for use as foil, sheet or ribbon in various thickness and widths.

We claim:

1. A low temperature, lead-free metal solder composition comprising by weight:
   0.5-4.0% antimony
   0.5-4.0% zinc
   0.1-3.0% silver
   0.1-2.0% copper
   88.0-98.8% tin.

2. The composition of claim 1, further having a solidus temperature of no less than 390° F. and a liquidus temperature of no more than 530° F.

3. The composition of claim 1, said metals comprising by weight:
   4.0% antimony
   4.0% zinc
   1.0% silver
   0.2% copper
   90.8% tin.

4. The composition of claim 1, said metals comprising by weight:
   3.0% antimony
   1.5% zinc
   0.5% silver
   0.5% copper
   94.5% tin.

5. The composition of claim 4, further having a solidus temperature of 420° F. and a liquidus of 443° F.

6. A low temperature, lead-free metal solder composition comprising by weight:
   3.0% silver
   0.5% copper
   96.5% tin.

* * * * *